(12) United States Patent
Tai et al.

(10) Patent No.: US 8,441,152 B2
(45) Date of Patent: May 14, 2013

(54) RENEWABLE ENERGY TRANSMISSION, GENERATION, AND UTILIZATION DEVICE AND METHOD

(76) Inventors: Chih-Cheng Tai, Sunnyvale, CA (US); Lucas J. Myslinski, San Jose, CA (US); Chyh-Yih Chang, Xinzhuang (TW); Shih Ming Tseng, Campbell, CA (US); Shih Hsiang Tseng, Campbell, CA (US)

( * ) Notice: Subject to any disclaimer, the term of this patent is extended or adjusted under 35 U.S.C. 154(b) by 263 days.

(21) Appl. No.: 12/774,392

(22) Filed: May 5, 2010

(65) Prior Publication Data
US 2011/0031820 A1 Feb. 10, 2011

Related U.S. Application Data

(60) Provisional application No. 61/273,513, filed on Aug. 5, 2009, provisional application No. 61/289,286, filed on Dec. 22, 2009, provisional application No. 61/306,335, filed on Feb. 19, 2010.

(51) Int. Cl.
*H01F 27/42* (2006.01)

(52) U.S. Cl.
USPC .......................................................... 307/104

(58) Field of Classification Search .................. 307/151, 307/104; 290/52, 54, 55; 310/171
See application file for complete search history.

(56) References Cited

U.S. PATENT DOCUMENTS

| 5,394,016 | A | 2/1995 | Hickey | |
|---|---|---|---|---|
| 6,097,104 | A | 8/2000 | Russell | |
| 6,657,351 | B2 * | 12/2003 | Chen et al. | 310/171 |
| 7,453,167 | B2 * | 11/2008 | Gilbert | 290/55 |
| 7,462,955 | B2 * | 12/2008 | McNamara et al. | 307/64 |
| 2005/0180851 | A1 | 8/2005 | Gordon | |
| 2008/0292467 | A1 | 11/2008 | Borgen | |
| 2009/0276952 | A1 * | 11/2009 | Wooten | 4/541.6 |
| 2009/0302681 | A1 * | 12/2009 | Yamada et al. | 307/46 |

OTHER PUBLICATIONS

Powercast http://www.powercastco.com/.
Wireless Power Transmission Using Magnetic Resonance, by: Lucas Jorgensen and Adam Culberson http://www.comellcollege.edu/physics/courses/phy312/Student-Projects/Magnetic-Resonance/Magnetic-Resonance.html.
Wireless Power Supplies Using Magnetic Resonance http://phys.org/news192981607.html.
How Wireless Power Transmission Works http://news.softpedia.com/news/How-Wireless-Power-Transmission-Works-86040.shtml.
International Search Report, Sep. 17, 2010.
MIT team experimentally demonstrates wireless power transfer, potentially useful for powering laptops, cell phones without cords; http://web.mit.edu/newsoffice/2007/wireless-0607.html.
Intel's Wireless Power Technology Demonstrated http://thefutureofthings.com/news/5763/intel-s-wireless-power-technology-demonstrated.html.

* cited by examiner

*Primary Examiner* — Daniel Cavallari
(74) *Attorney, Agent, or Firm* — Haverstock & Owens LLP

(57) ABSTRACT

The power generation and transmission device and method is able to be used to harness power such as solar and/or wind power and then transmit the power to a device on the other side of a physical structure such as a house, a car, a umbrella, a tent, and an awning.

15 Claims, 16 Drawing Sheets

US 8,441,152 B2

RENEWABLE ENERGY TRANSMISSION, GENERATION, AND UTILIZATION DEVICE AND METHOD

CROSS-REFERENCE TO RELATED APPLICATION(S)

This application claims priority under 35 U.S.C. 119(e) of the U.S. Provisional Patent Application Ser. No. 61/273,513, filed Aug. 5, 2009, and entitled, "POWER GENERATION AND TRANSMISSION DEVICE AND METHOD;" the U.S. Provisional Patent Application Ser. No. 61/289,286, filed Dec. 22, 2009, and entitled, "INSTANT ATTACHABLE AND DETACHABLE SOLAR LIGHTING DEVICE;" and the U.S. Provisional Patent Application Ser. No. 61/306,335, filed Feb. 19, 2010, and entitled, "Light, Fan and Advertisement Devices" which are all hereby incorporated by reference in its entirety for all purposes.

FIELD OF THE INVENTION

The present invention relates to the field of power generation, transmission, and/or utilization. More particularly, the present invention relates to the field of receiving renewable energy with an external device and generation, transmission, and/or utilization of the power with an internal device.

BACKGROUND OF THE INVENTION

The typical method of power transmission from a solar panel involves using a power line cable to connect the solar panel to a battery or directly to a device within the house or the opposite side of a structure. This requires physical damage to the house and/or the structure. Often, it generally requires a handyman or contractor to install. Furthermore, the time and effort can be expensive.

SUMMARY OF THE INVENTION

The power generation and transmission device and method is able to be used to harness power such as solar and/or wind power and then transmit the power to a device inside a structure such as a house, umbrella, or a car.

In an aspect, a renewable energy transmission device comprises a renewable energy receiving component, an actuator capable of using an energy received by the renewable energy receiving component, so that the actuator is capable of causing a first member moving in a rotational manner, and a second member magnetically coupling with the first member, so that a rotational movement of the first member is able to drive the second member moving in a rotational manner, thereby the energy received is able to be transmitted from the renewable energy receiving component to the second member.

In some embodiments, the renewable energy receiving component comprises a solar panel. In alternative embodiments, the renewable energy receiving component comprises a wind turbine. In other embodiments, the actuator comprises a motor. In some embodiments, the first member comprises one or more magnets. In some embodiments, the one or more magnets comprise a first magnet having a magnetic field substantially parallel with a magnetic field of a second magnet. In alternative embodiments, the second member comprises one or more magnets, wherein the one or more magnets are arranged in a way capable of coupling with the one or more magnets of the first member, so that the first member is capable of driving the second member moving in a substantially synchronized manner. In other embodiments, the second member couples with a wind turbine. In some embodiments, the second member couples with a generator capable of generating electricity. In alternative embodiments, the second member couples with a light emitting device. In other embodiments, the first member is able to remotely drive the movement of the second member with a physical barrier between the first and the second member.

In an alternative aspect, a renewable energy transmission device comprises a first portion containing a renewable energy receiving member and a first rotor capable of using a renewable energy received by the renewable energy receiving member and a base containing a second rotor capable of magnetically coupling with the rotor in the first portion, thereby the renewable energy received is able to be utilized by a utility component coupling with the base.

In some embodiments, the first rotor is capable of remotely coupling with the second rotor, thereby the renewable energy received is able to be transmitted from the first portion to the base with a physical separation between the first portion and the base. In alternative embodiments, the first portion, the base, or a combination thereof is able to be instantly attached to and detached from two opposite sides of a physical structure. In other embodiments, the physical structure comprises an umbrella, a tent, an awning, a layer of glass, a layer of plastic material, or a combination thereof. In some embodiments, the first portion comprises a first shell and the base comprise a second shell, wherein the first shell and the second shell are able to form a continuous pattern when the first shell couples with the second shell.

In another aspect, a method of renewable energy transferring comprises receiving a renewable energy, converting the renewable energy into a first rotational motion, and generating a second rotational motion by using the first rotational motion, thereby the renewable energy is transferred into the second rotational motion.

In some embodiments, the first rotational motion is separated from the second rotational motion with a physical structure. In alternative embodiments, the method further comprises remotely transferring the renewable energy to become the second rotational motion. In other embodiments, the second rotational motion comprises a wind turbine motion, a motion capable of generating electricity, or a combination thereof.

DETAILED DESCRIPTION OF THE PREFERRED EMBODIMENT

The power generation and transmission device and method is able to be used to harness power such as solar and/or wind power and then transmit the power to a device inside a structure such as a house, dog house, a tent, a café umbrella, or a car.

Figure 1:
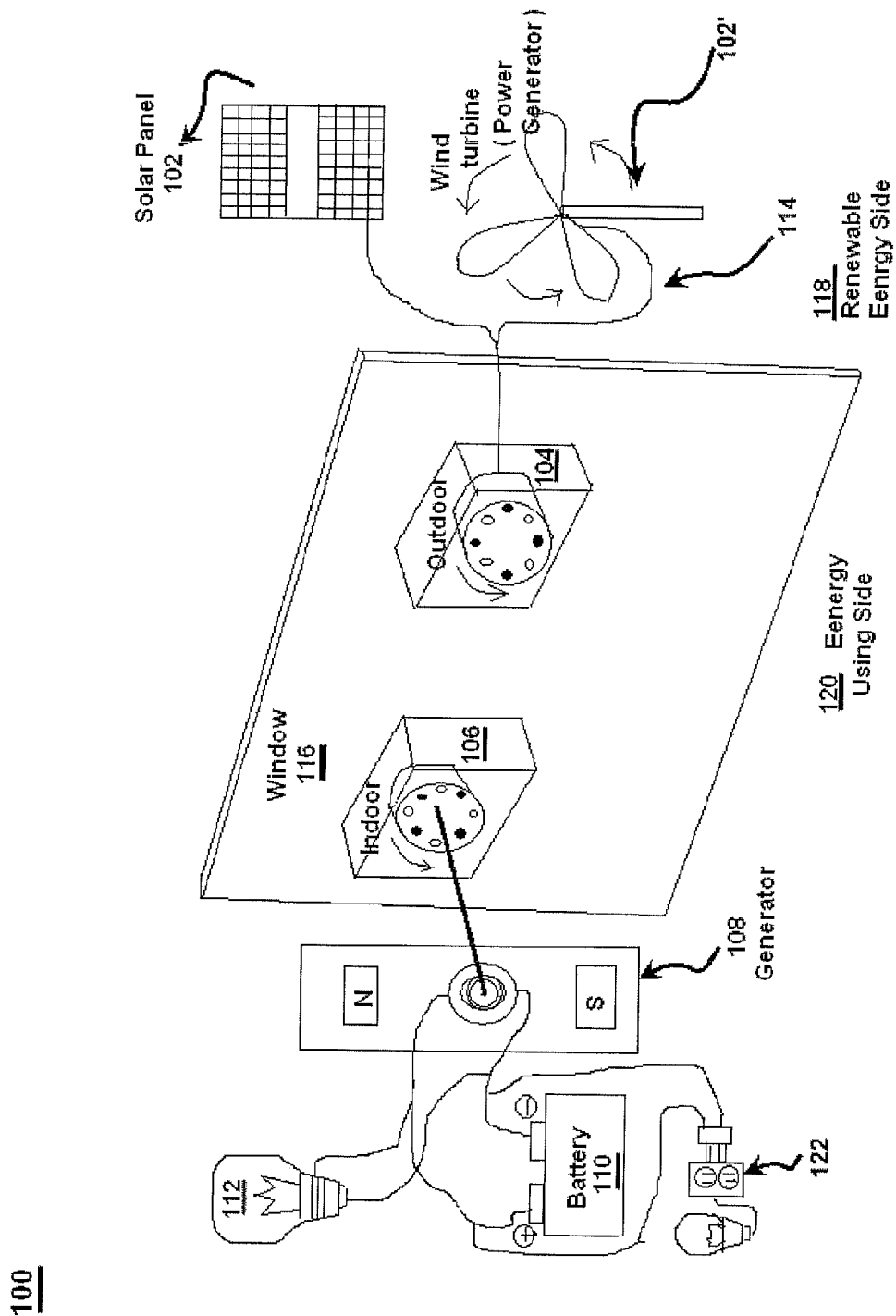
FIG. 1 illustrates a diagram of a wireless power system according to some embodiments of the present application.

FIG. 1 illustrates a diagram of a power system 100 in accordance with an embodiment of the present invention. The power system 100 includes an electric generator 102, such as one or more solar panels and/or one or more wind power generators 102'. The electric generator 102 couples to an energy receiving component 104. In some embodiments, the electric generator 102 is coupled to the energy receiving component 104 with a cable 114. The energy receiving component 104 is configured to move or rotate using the energy received from the electric generator 102. In some embodiments, the energy receiving component 104 is circular or any shape. The energy receiving component 104 is configured to couple to a renewable energy side 118 of a structure 116. The structure 116 is able to be a window, a wall, a ceiling, a cloth, a tent surface, an umbrella surface, and/or another structure or any physical barriers. An energy generating component 106 is configured to rotate in response to the energy receiving component 104. In some embodiments, the energy generating component 106 is circular or any shape. The energy generating component 106 is coupled to the structure 116 on an inner side or an energy using side 120. The energy receiving component 104 and the energy generating component 106 are coupled to the structure 116 by any means such as a suction cup, a vacuum, magnetic forces, or any other means. The energy receiving component 104 and the energy generating component 106 are configured with an implementation to enable the energy receiving component 104 to cause the energy generating component 106 to rotate. In some embodiments, the implementation includes one or more magnets. Exemplary numbers of magnets on each of the energy receiving component 104 and the energy generating component 106 include 1, 2, 3, 4, 5, 6, 7, 8 and/or more magnets. Any positioning of the magnets is possible. In some embodiments, the magnets are positioned to maximize the efficiency of the energy transfer from the energy receiving component 104 to the energy generating component 106. The energy generating component 106 is coupled to a generator 108. The generator 108 generates power to be stored or used. In some embodiments, the generator 108 is coupled to one or more batteries 110. In some embodiments, the one or more batteries 110 are coupled to a device 112 such as a fan, a light, an air filter or any other device. In some embodiments, the generator 108 is coupled directly to the device 112 without the batteries 110. In some embodiments, the batteries 110 are coupled to an outlet 122 (e.g. a standard outlet similar to a wall outlet in a home). Then, the device 112 is able to couple to the outlet 122. This enables the device 112 to be a device with a standard plug.

Figure 2:
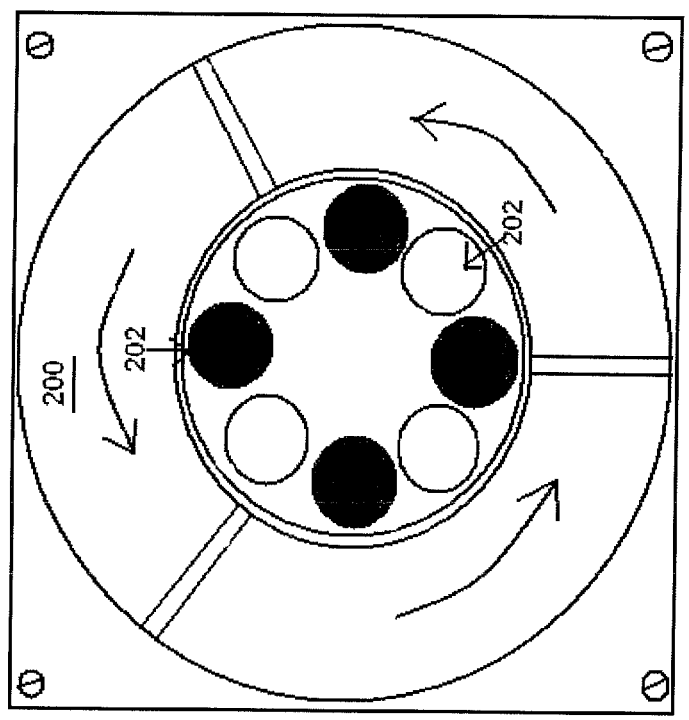
FIG. 2 illustrates a front view of a wireless energy receiving component according to some embodiments of the present application.

FIG. 2 illustrates a front view of an energy receiving component 104 (FIG. 1) according to some embodiments. The energy receiving component 104 includes a disc structure 200 (or another structure) and one or more magnets 202 (e.g. 4 or 8). The magnets 202 are able to be any kind of magnets, such as neodymium discs. In some embodiments, the magnets are configured in an alternating polarity configuration. In some embodiments, the magnets are configured in a same polarity configuration. As such, the energy generating component 106 has the same or similar configuration as the energy receiving component 104. In some embodiments, the magnets are able to be in any configurations so long as the magnets in the energy receiving component 104 are able to couple to and/or drive a movement of the energy generating component 106. A person of ordinary skill in the art would appreciate any patterns, materials, forces of the magnets are applicable with the power system 100, so that the efficiency/rate of the power conversion, power transmission, and power utilization by the energy generating device 106 are able to be controlled.

Figure 3:
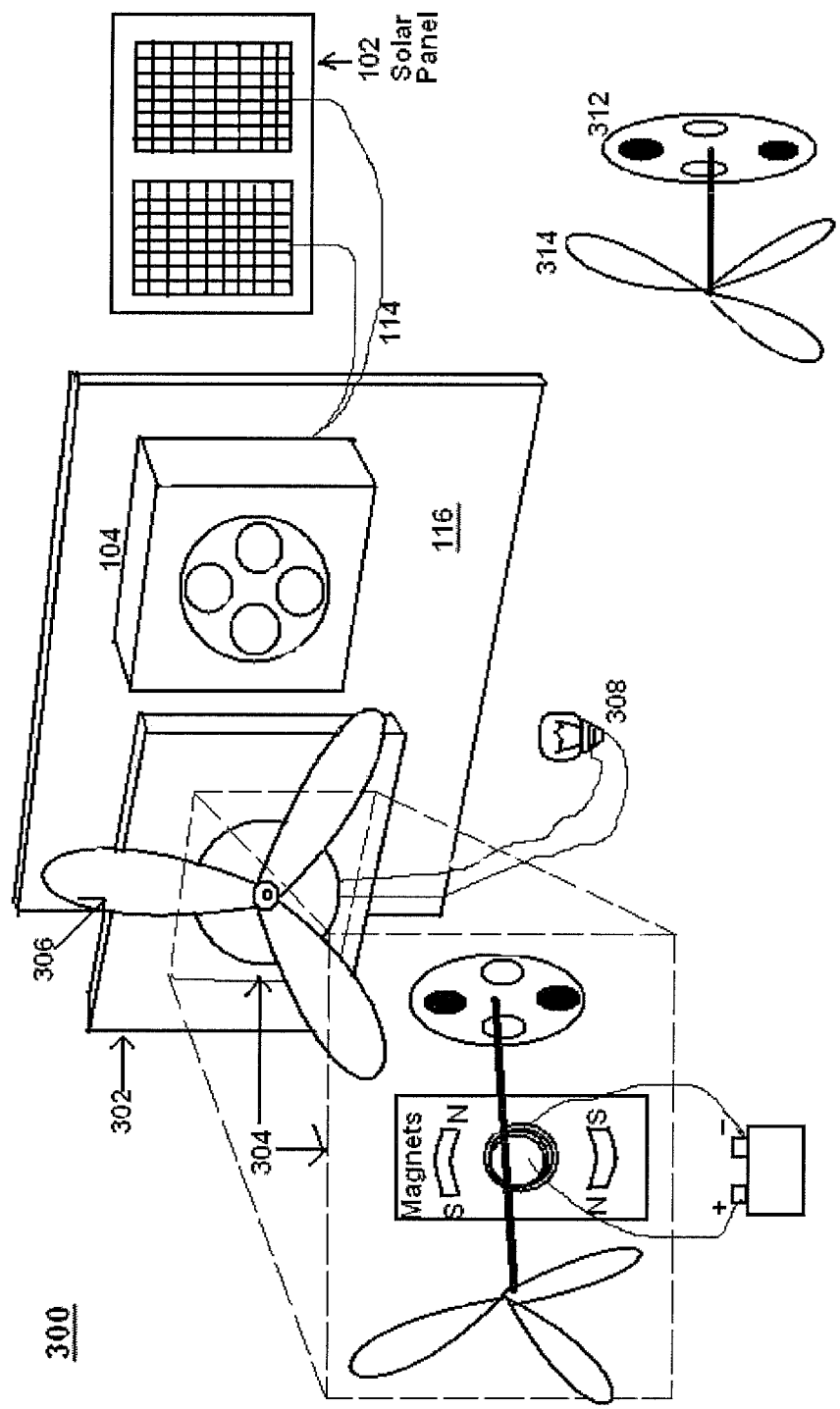
FIG. 3 illustrates a diagram of a wireless power system according to some embodiments of the present application.

FIG. 3 illustrates a diagram of a power system 300 in accordance with some embodiments of the present invention. The power system 300 includes an electric generator 102 such as one or more solar panels and/or one or more wind power generators. The electric generator 102 couples to an energy receiving component 104. In some embodiments, the electric generator 102 is coupled to the energy receiving component 104 with a cable 114. The energy receiving component 104 is configured to rotate using the energy received from the electric generator 102. In some embodiments, the energy receiving component comprises an electric motor. In some embodiments, the energy receiving component 104 is circular or any shape. The energy receiving component 104 is configured to couple to an outer side of a structure 116 such as a window, a wall, a ceiling, umbrella, tent, gazebo, hat, cap, cloth, and/or another structure. A device 302 such as a fan is configured to rotate in response to the energy receiving component 104. The device 302 is coupled to the structure 116 on an inner side. The energy receiving component 104 and the device 302 are configured with an implementation to enable the energy receiving component 104 to cause the device 302 to rotate. In some embodiments, the implementation includes one or more magnets. Exemplary numbers of magnets on each of the energy receiving component 104 and the device 302 include 1, 2, 3, 4, 5, 6, 7, 8 and/or more magnets. Any positioning of the magnets is possible. In some embodiments, the magnets are positioned to maximize the efficiency of the energy transfer from the energy receiving component 104 to the device 302. In some embodiments, the device 302 includes a fan 306, a light 308, an air filter or any combination thereof.

In some embodiments, the device 302 is able to be a power generation device. For example, the device 302 comprises a power generator 304. The power generator 304 is able to be a traditional power generator, which converts the kinetic energy (from the rotation of the device 302 induced by the magnetic coupling from the device 104) to electric energy using the principle of moving a circuit in a magnetic field generating electric current.

In some embodiments, the device 302 is able to be any of various instantly replaceable appliances. For example, the device 302 is able to be a fan 306 that magnetically couples to the movement driven device 104, so the device 104 and device 302 immediately attach (magnetic attraction) to the opposite sides of the media 116, such as a glass window. When other applications are thought to be used, the fan 306 can be instantly removed and replaced with the generator 304. A person of ordinary skill in the art would appreciate that the power generating function is optional, so the fan 312 is able to be a mechanical fan magnetically couple with the movement driven device 104. The fan 312 is able to use rotating axis to drive the fan portion 314 without having the function or components of power generating.

In some embodiments, the device 302 is able to comprise a power generator coupled to an electricity or power storage device, which is able to be the power source for various home appliances. Accordingly, the power system 300 forms a solar energy (renewable energy) power station. The power station is able to store energy whenever the renewable energy receiver 102 receives energy and subsequently convert to kinetic energy moving power generating device 302 to generate energy. The energy generated is able to be used at anytime even at the time the renewable energy does not exist. For example, the renewable energy receiving device 102 is able to receive solar energy when the sun light exists or wind power when wind exists; nonetheless, the electricity generated can be pre-stored at a rechargeable battery and be used at night or when no wind exists. Accordingly, above describes a method of time-delay usage of the renewable energy.

In some embodiments, the power system 300 is able to include a fan for an animal house. For example, a dog house. The power system 300 comprises a solar panel attached to the energy receiving device 104. Alternatively, the power system 300 couples to the energy receiving device 104 through a power line. The solar panel 102 and energy receiving device 104 are outside of the dog house. The power system 300 comprises a fan 306 inside the dog house. Accordingly, the power system 300 is able to facilitate air circulation of the dog house. Having the power system 300 with the fan, the smell of the dog house can be reduced or eliminated.

Figure 4:
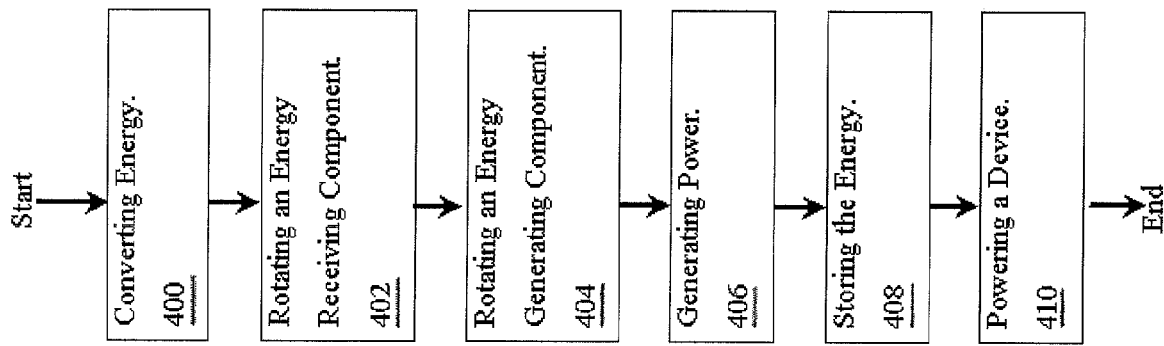
FIG. 4 illustrates a flowchart of a method of using the wireless power system according to some embodiments of the present application.

FIG. 4 illustrates a flowchart of a method of using the power system according to some embodiments. In the step 400, energy is converted by a solar device and/or wind device. In the step 402, the energy rotates an energy receiving component. In the step 404, the energy receiving component rotates an energy generating or utilizing component, such as a motor or a fan. In the step 406, the energy generating component rotates a generator component to generate power or moves a mechanical device, such as a fan, to utilize the power. In the step 408, the power generated by the generator is stored in a battery or used to move a fan. In the step 410, a device is powered, for example, by the battery. In some embodiments, some of the steps are skipped. For example, in a system where there is no battery, the step 408 is skipped and the power goes directly to the device.

Figure 5:
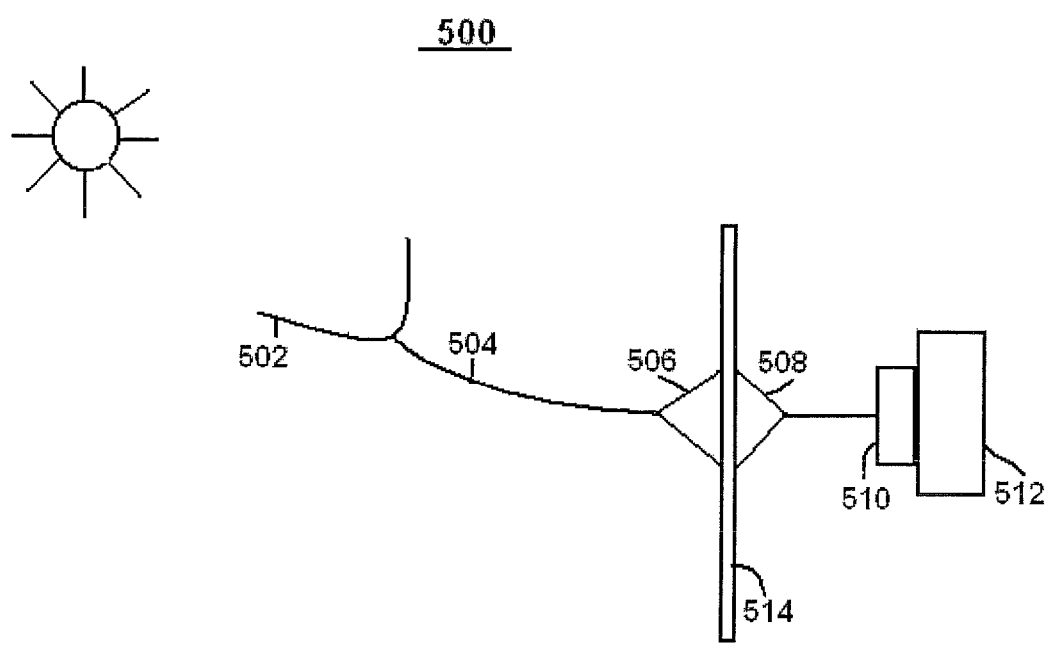
FIG. 5 illustrates a diagram of a power system according to some embodiments of the present application.

FIG. 5 illustrates a diagram of a power system 500 according to some embodiments. A mirror 502 is used to collect sunlight which is transferred via an optical fiber 504. The optical fiber is coupled to a first collector 506 which directs the sunlight through a window 514 to a second collector 508. The second collector 508 directs the light to a solar panel 510. The solar panel 510 is coupled to a device 512 such as a fan or coffee pot. In some embodiments, the solar panel is comprised of a plant matter. In some embodiments, the device 512 is able to have replaceable covers/skins.

Figure 6:
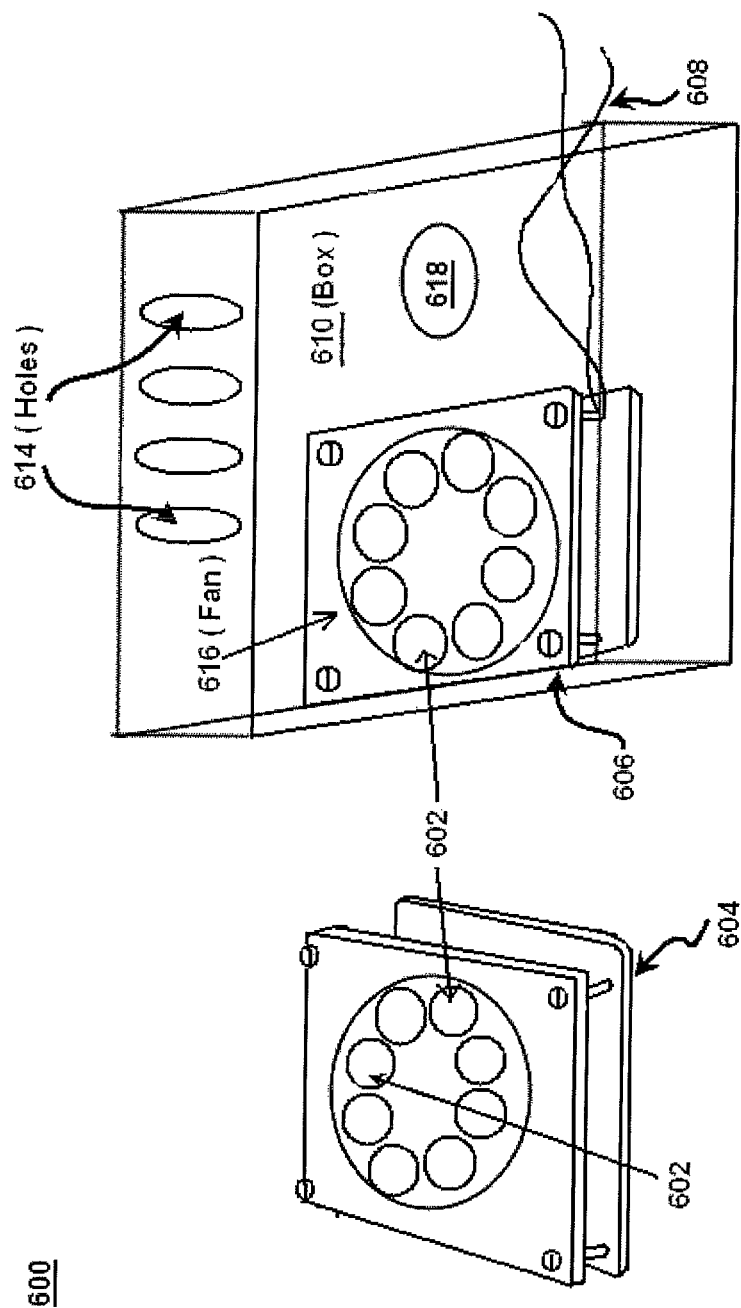
FIG. 6 illustrates a solar-power air device according to some embodiments of the present application.

FIG. 6 illustrates a solar-power air device 600 in accordance with some embodiments of the present application. The solar-power air device 600 comprises the functions of an air circulator and air refresher. The device 600 comprises an energy receiving device 604. The energy receiving device 604 couples to the renewable energy receiving device 102 (FIG. 1), such as a solar panel. The energy receiving device 604 can contain a motor, which is driven by the power received by the renewable energy receiving device 102 (FIG. 1). The motor's rotational motion carries the magnets 602 on the energy receiving device 604 to move in a rotational manner. The magnets 602 on the energy receiving device 604 magnetically couple to the magnets 602 on the generator device 606, and the rotational movements of the magnets 602 on the device 604 couple to the magnets 602 on the generator device 606 making the device move in a rotational manner. In some embodiments, the generator device 606 is able to be a motor containing magnets and wires. The rotational movement of the generator device 606 generates electricity and output through power line 608. In some embodiments, the generator device 606 is able to be enclosed in a box 610 having a cover. The cover comprises holes 614. Further, the cover is able to receive the box 610. Additionally, the box 612 can include air-refresher or perfume box 618. The box 610 is able to contain liquid or solid fragrance and/or water. When the fan 616 is functioning, the fan 616 is able to blow the air-refresher or perfume in the box 610 through the holes 614 to a space desired, such as user's office. The fan 616 is able to be designed to be an effective air circulator, which can facilitate the air circulation of the user's office.

Figure 7:
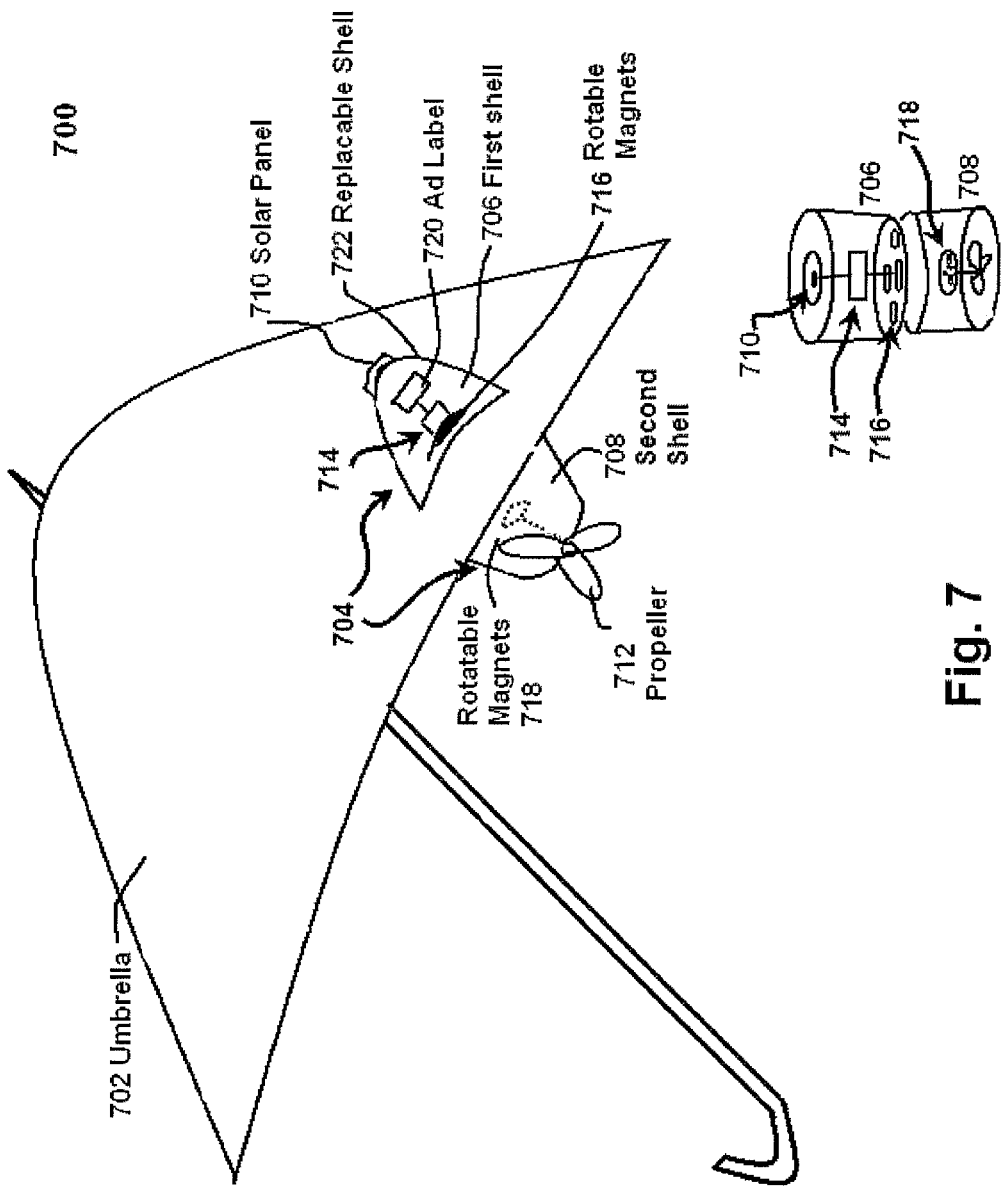
FIG. 7 illustrates a view of a fan-umbrella system according to some embodiments of the present application.

FIG. 7 illustrates a view of a fan-umbrella system 700 according to some embodiments. The fan-umbrella system 700 includes an umbrella 702 and a solar fan 704 coupled to the umbrella 702. In some embodiments, the umbrella 702 is an unmodified umbrella so that the solar fan 704 is able to be used with any umbrella. In some embodiments, the umbrella is specifically designed to couple with the solar fan 704. The solar fan 704 includes a first shell 706 and a second shell 708 which couple to each other with a portion of the umbrella 702 sandwiched between. The first shell 706 and the second shell 708 couple in any manner, such as with magnets contained in each shell. The first shell 706 includes a solar panel 710 and/or a wind device to receive solar energy and/or wind energy. The second shell 708 includes a fan propeller 712. The solar panel 710 is coupled to rotating device 714 which is coupled to a first set of rotatable magnets 716. The fan propeller 712 is coupled to a second set of rotatable magnets 718. As the solar panel 710 receives energy and converts the energy, the rotating device 714 rotates which causes the first set of magnets 716 to rotate which causes the second set of magnets 718 to rotate as long as they are within an appropriate distance from each other (e.g. a few centimeters apart with the umbrella material in between, such as 1-5 cm). The second set of magnets 718 rotating causes the fan propeller 712 to rotate which generates a cool breeze for someone under or near the umbrella. In some embodiments, instead of coupling to an umbrella 702, the solar fan 704 is able to be coupled to any object, for example, an awning and/or a camping tent. In some embodiments, the solar fan 704 includes a label 720 such as an advertisement. In some embodiments, the solar fan 704 includes a replaceable shell 722. The replaceable shell 722 is able to include advertisements, sports logos and any other text or picture representation. In alternative embodiments, the replaceable shell 722 is molded into a shape of a merchandise, such as a beer can or bottle, a baseball, a basketball, a football, a tennis ball, or a golf ball. For example, the first shell 706 and second shell 708 form a coffee cup or beer can or bottle when they are placed together. The first shell 706 is able to be placed at the side capable of receiving solar energy and the second shell 708 is able to be placed at the side where a fan is needed. For example, the first shell 706 is able to be placed on top of a café umbrella, the second shell 708 is able to be placed on the inside of the café umbrella, and the umbrella 702 is placed between the first shell 706 and the second shell 708. In some embodiments, one or more batteries are utilized to store energy for later use.

Figure 8:
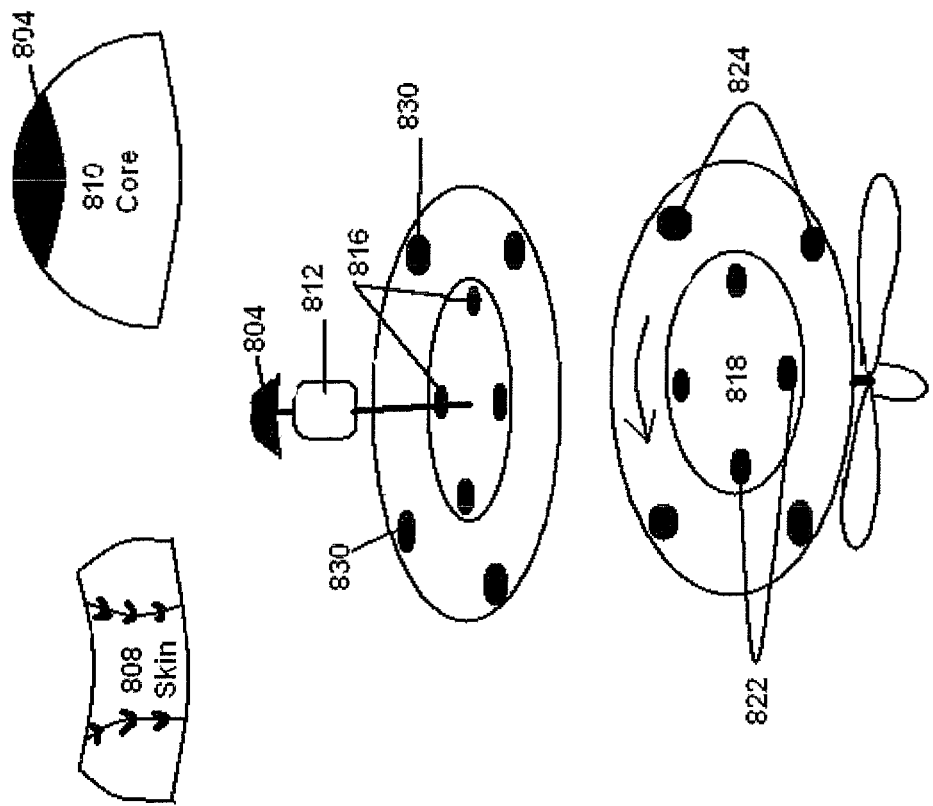
FIG. 8 illustrates a solar fan system according to some embodiments of the present application.
Figure 8:
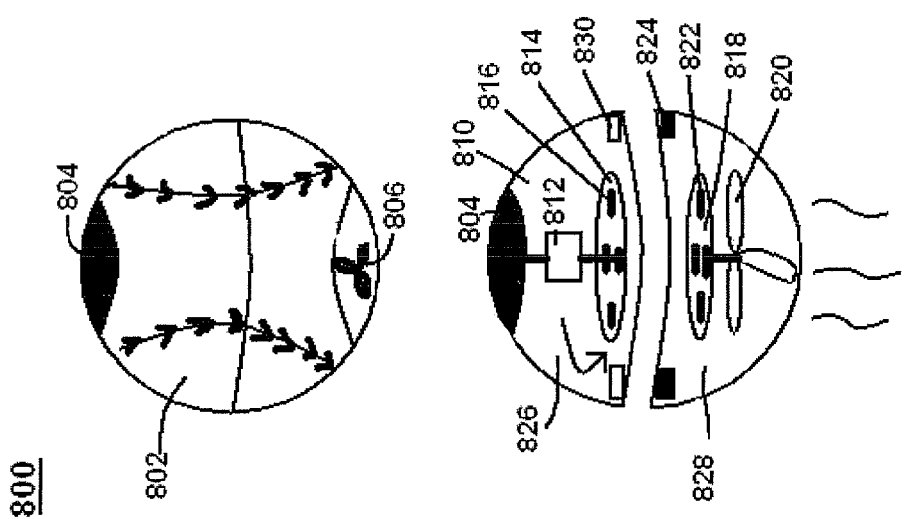

FIG. 8 illustrates a solar fan system 800 according to some embodiments. The solar fan system 800 is able to comprise a body 802. The body 802 of the solar fan system 800 is able to contain a solar panel 804 and fan 806. The body 802 is able to contain a skin 808 on top of the core 810. The skin 808 is able to be made from any material, such as plastic or leather so long as it provides a look of product desired, such as a baseball. The skin 808 is able to enclose a core 810, which can be a hard plastic case. The body 802 is able to contain a top part 826 and bottom part 828. The top part is able to contain a motor 812, which is able to drive a disk 814 to move in a rotational manner. The disk 814 is able to comprise magnets 816, which couples to the magnets 822 on the disk 818 on the bottom part 828, so that the disk 814 is able to synchronize in a rotational movement with the disk 818. The bottom part 828 is able to comprise the disk 818 with the magnets 822. The disk 818 can drive a fan to work with a mechanical force moving in a rotational manner.

In some embodiments, the top part 826 is able to be secured with the bottom part 828 in various methods. For example, the top part 826 is able to contain magnets 830 having magnetic forces to attract the magnets 824 in the bottom part, so that the top part 826 is able to be instantly attachable and detachable from the bottom part 828. In such case, the solar device 800 is able to be instantly attached to and detached from the host, such as the garden umbrella and tents.

Figure 9:
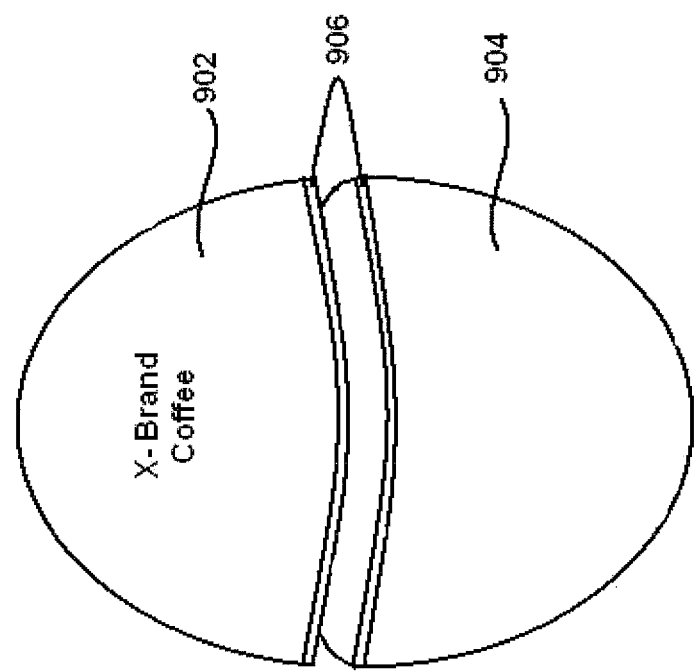
FIG. 9 illustrates examples of an advertising device according to some embodiments of the present application.

FIG. 9 illustrates examples of an advertising device according to some embodiments. In some embodiments, the advertising device 900 includes a first component 902 and a second component 904 which are able to approximately couple to each other using a coupling mechanism 906. For example, the first component 902 is positioned on the upper side of an umbrella and the second component 904 is positioned on the under-side of the umbrella. Although the first component 902 and the second component 904 may not physically touch, through the use of the coupling mechanism 906, they are able to be secured on the umbrella. The coupling mechanism 906 is able to be any coupling mechanism, such as magnets, a hook and loop structure (e.g., Velcro™, tape, and/or any other mechanism. In some embodiments, the coupling mechanism 906 also enables the first component 902 and the second component 904 to be removed and placed on any number of objects. Either or both of the first component 902 and the second component 904 are able to include an advertisement and/or any other text, logo or picture. The advertising device 900 is able to be simple and include a minimal amount of components or is able to be more complex and include the solar fan described herein, one or more lights, and/or any other additions. The shape of the advertising device 900 is able to be any shape. In some embodiments, the shape is a sports item such as a baseball, basketball, football or a food item such as a coffee cup. The advertising device is able to provide additional advertising space to inform potential customers. The first component 902 and the second component 904 are able to stand alone on the umbrella without the need of coupling with each other. Either the first component 902, the second component 904, or both are able to couple to the umbrella using the coupling mechanism described above, such as Velcro™

Figure 10:
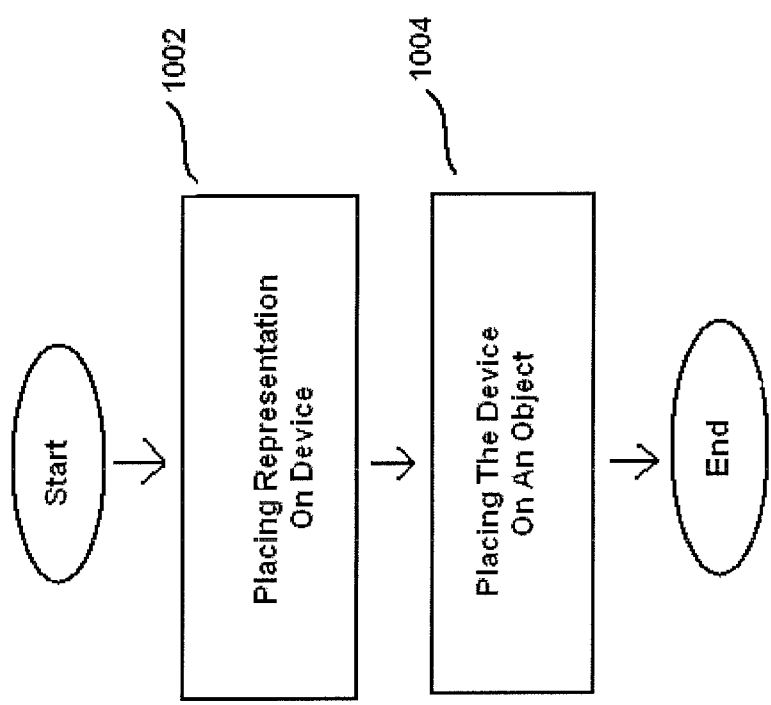
FIG. 10 illustrates a flowchart of a method of advertising using a device according to some embodiments of the present application.

FIG. 10 illustrates a flowchart of a method of advertising using a device according to some embodiments. In the step 1002, a representation, such as an advertisement, is placed on the device. The representation is able to be any representation such as a logo, text, graphics and/or anything to convey a message. The representation is able to be placed on the device by a manufacturer or another entity. The step 1002 is able to be skipped if the device already has the representation. In the step 1004, the device is placed on an object such as an umbrella, an awning, a table, a car, a window and/or any other object. In some embodiments, the method of placing the device on the object is by using the implementations described herein, for example, by placing one component on one side of the object and the other component on the other side of the object, and the two components approximately coupling together through the use of magnets. In some embodiments, other implementations are able to be used to place the device on the object. Once the object is placed accordingly, the representation is available for others to see. For example, at a coffee shop with umbrella tables, solar fans with logos of the shop are able to be placed on the umbrellas to provide a cool breeze and advertising for the shop. Since the devices are easily removable, they are able to be moved as desired. Furthermore, in some embodiments, the representation is able to be modified easily (e.g. replacing a shell of the device), to enable easy advertisement space selling. The device is able to be any device, such as the solar fan. In some embodiments, additional or fewer steps are able to be included.

Figure 11:
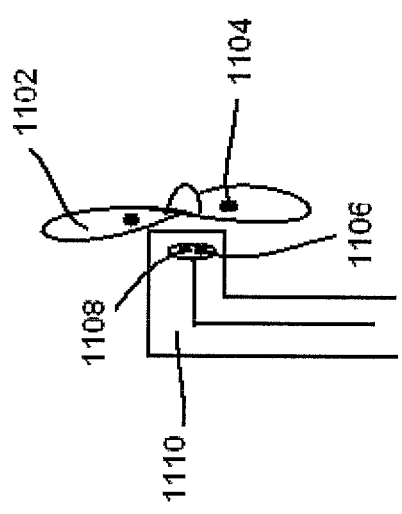
FIG. 11 illustrates a cross-sectional view of a wind turbine according to some embodiments of the present application.

FIG. 11 illustrates a cross-sectional view of a wind turbine according to some embodiments. The wind turbine 1100 includes a propeller 1102, a first set of magnets 1104, a second set of magnets 1106, an energy generating component 1108 and a casing 1110. The first set of magnets 1104 are coupled to or within the propeller 1102. The first set of magnets 1104 rotate as the propeller 1102 rotates from wind. As the first set of magnets 1104 rotate, they cause the second set of magnets 1106 to rotate which, in turn, cause the energy generating component 1108 (or at least an aspect of the energy generating component 1108) to rotate and generate energy similar to the energy generating component described above. Since the second set of magnets 1106 and the energy generating component 1108 are contained within the casing 1110, they are protected from the weather and other harmful elements. The energy generated is able to be transferred to any device to utilize the energy such as a battery, a power grid and/or any other device.

The solar fan and other devices described herein offer an additional safety feature compared to standard fans since there is a gap between the two components of the solar fan. If a child places his hand in the fan, there is no bar directly connected to a motor that would keep the fan moving even with the child's hand there. Instead, the magnetic coupling would be interrupted and the fan would stop.

Figure 12:
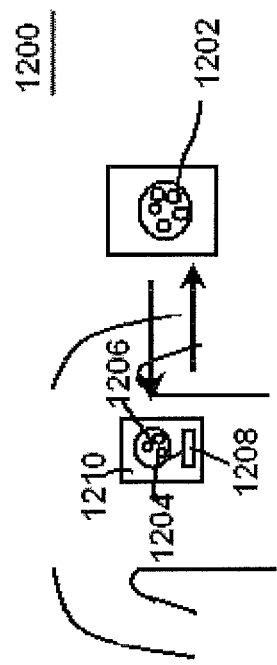
FIG. 12 illustrates a view of a remote charger system according to some embodiments of the present application.

FIG. 12 illustrates a view of a remote charger system according to some embodiments. A remote charger 1200 operates similar to the power generator described above. The remote charger 1200 includes a set of magnets 1202 that rotate. The magnets 1202 cause a power generator 1204, containing a second set of magnets 1206, in a remote device 1210 to generate electricity which is able to be stored, for example, in a battery 1208. For example, a remote charger with rotating magnets is placed on or near a person's chest and contained within the person is a pacemaker with an electricity generator and a battery. The remote charger is able to charge the pacemaker's battery without invasively affecting the person, thus saving the person from surgery.

Figure 13:
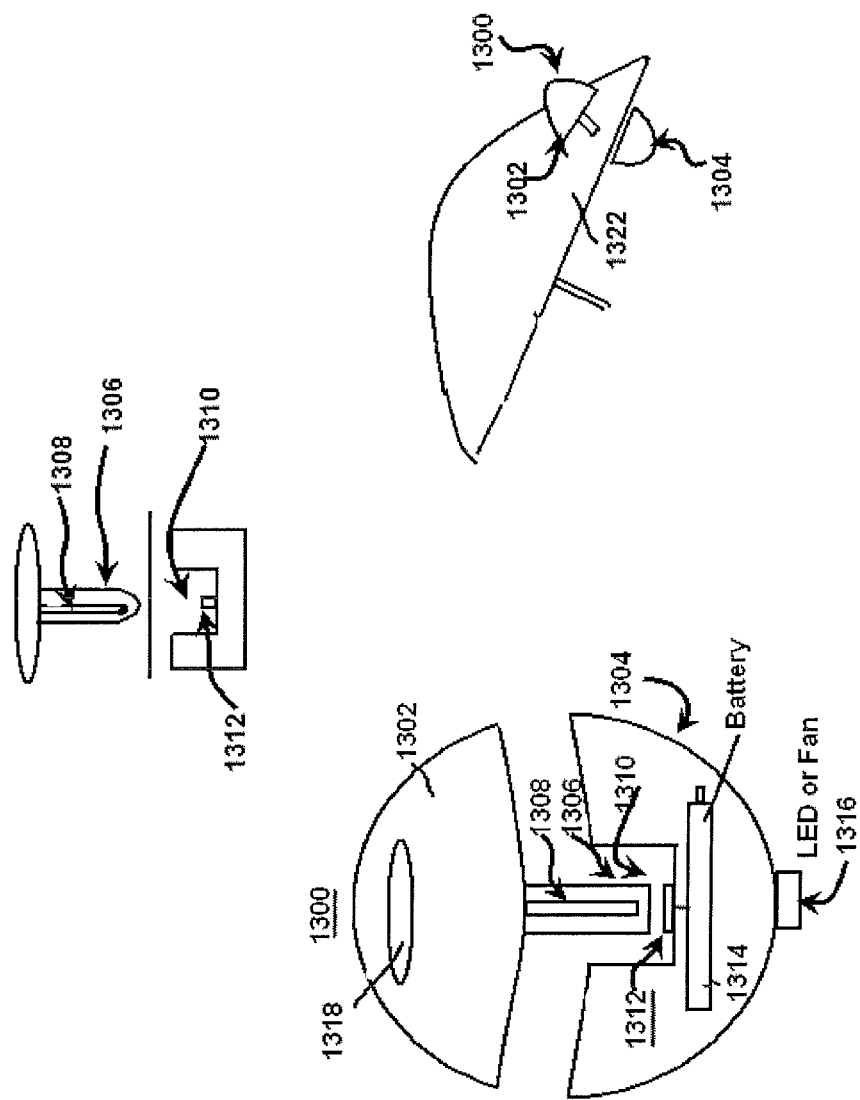
FIG. 13 illustrates a view of a device including a cutting mechanism according to some embodiments of the present application.

FIG. 13 illustrates a view of a device including a cutting mechanism according to some embodiments. The device 1300 includes a first component 1302 (e.g. first shell) and a second component 1304 (e.g. second shell). The device 1300 also includes a cutting mechanism 1306. In some embodiments, the cutting mechanism 1306 includes a protrusion with a sharp edge. In some embodiments, the cutting mechanism 1306 is located on the first component 1302 and is configured to fit within a receiving aperture 1310 of the second component 1304. In some embodiments, the cutting mechanism 1306 and the receiving aperture 1310 couple so that that the first component 1302 and the second component 1304 couple together. The cutting mechanism 1306 is configured to cut a hole or slit in an object 1322 to enable the device 1300 to be secured on the object 1322. The object 1322 is able to be an object such as an umbrella, awning, tent or any other object. In some embodiments, the cutting mechanism 1306 is or includes a conducting material 1308. The conducting material 1308 of the cutting mechanism 1306 is configured to couple with a conducting receiver 1312. The conducting material 1308 and conducting receiver 1312 enable energy to be transferred from an energy converting device 1318 such as a solar panel, wind turbine or turbine. In some embodiments, the energy is stored in a battery 1314. The energy is used to power an output device 1316 such as a light (e.g. LED), a fan or any other output device. The device 1300 is able to include a representation such as advertising.

As described above, the device 1300 (FIG. 13) includes a cutting mechanism 1306 which enables the device 1300 to be coupled to an umbrella 1300 by generating a small hole and the first component 1302 and the second component 1304 are able to couple together through. Although an umbrella is shown, any object is able to be used.

Figure 14:
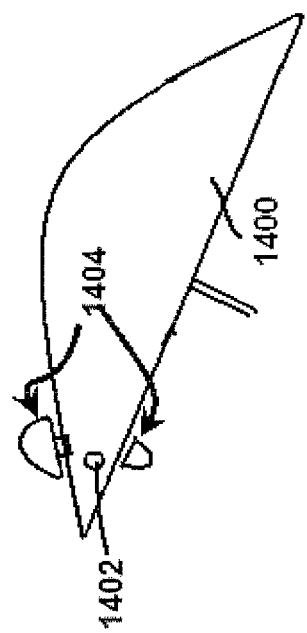
FIG. 14 illustrates a device including a securing mechanism positioned on an umbrella with an aperture according to some embodiments of the present application.

FIG. 14 illustrates a device including a securing mechanism positioned on an umbrella 1400 with an aperture according to some embodiments. In some embodiments, the umbrella 1400 includes an aperture 1402 such as a grommet with a hole in it. Where the umbrella 1400 includes the aperture 1402, a device 1404 (similar to the device 1300) does not need to include a cutter mechanism 1306 (FIG. 13). Instead the protrusion is able to be without a blade or sharp edge.

Figure 15:
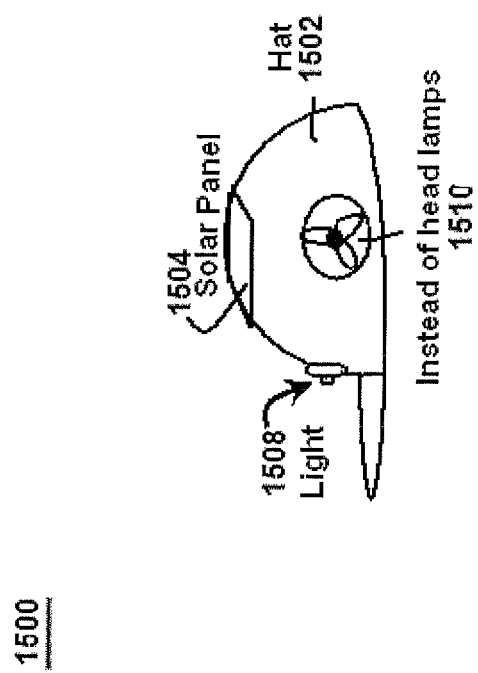
FIG. 15 illustrates an article of clothing system according to some embodiments of the present application.

FIG. 15 illustrates an article of clothing system according to some embodiments. The article of clothing system 1500 includes an article of clothing 1502 (e.g. a hat, jacket, shirt, pants, shoe/sneaker, sandal, underwear, bra, goggles or any other article of clothing. Coupled to the article of clothing 1502 is a solar panel 1504, particularly at the top of the article of clothing 1502. A battery 1506 is included with the article of clothing 1502 as well. In some embodiments, a light 1508 is included such as on the brim of a hat or attached to the front of the top of the hat. In some embodiments, a fan 1510 is included to provide a cooling effect. The fan 1510 is able to be included within the cap of the hat or on the bottom of the brim. Any variation of the article of clothing system 1500 is able to be implemented.

Figure 16:
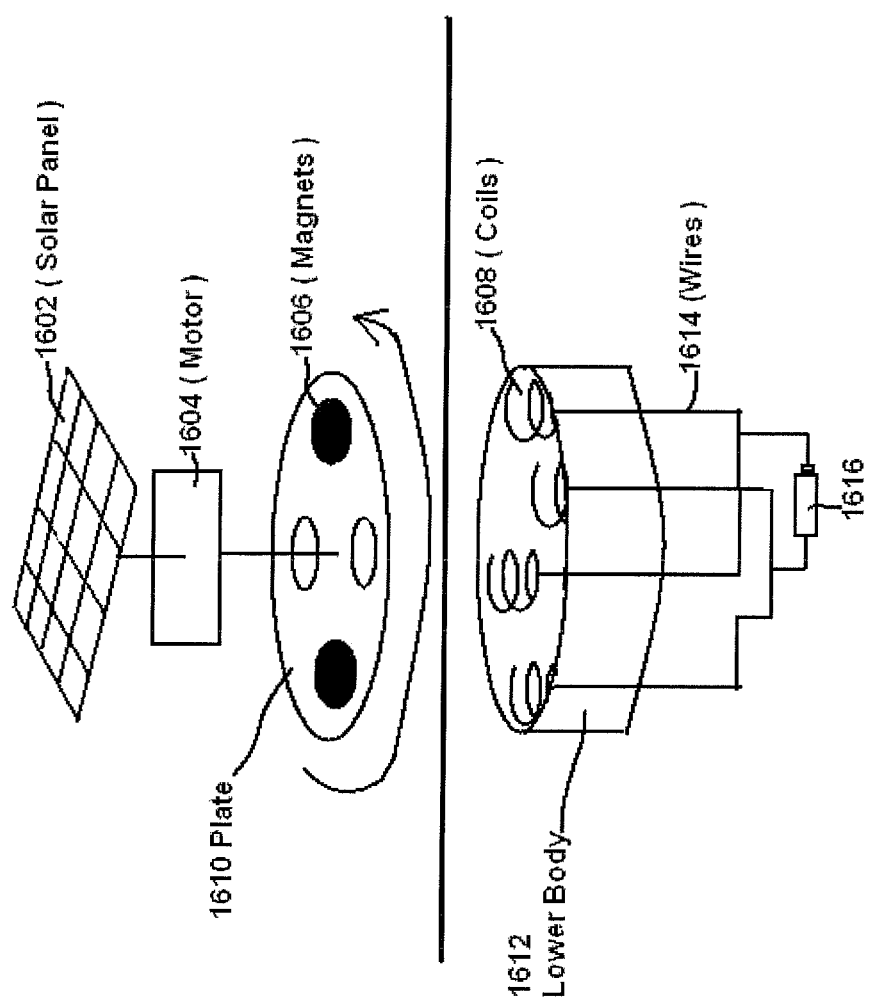
FIG. 16 illustrates an energy generating system according to some embodiments.

FIG. 16 illustrates an energy generating system according to some embodiments. The solar panel 1602 can receive solar or renewable energy to drive a movement of a motor 1604. The motor 1604 is able to drive a movement of the plate 1610 having magnets 1606, so that the magnets are rotating in a rotational manner. The lower body 1612 is able to contain coils 1608. The coils 1608 are able to connect to electric wires 1614, which connects to an energy usage or storage device 1616. When the solar panel 1602 receives renewable energy, the energy drives the movement of motor 1606, which drives the movement of plate 1610 and the magnets 1606. The lower body 1612 and coils 1608 are relatively stationary. Thus, the moving of rotating magnets 1606 induces the stationary coil 1608 to generate electricity.

The shape of the devices or aspects of the devices described herein is able to be any shape. In some embodiments, the shape is a sports item such as a baseball, basketball, football or a food item such as a coffee cup.

To utilize the power generation and transmission device and method, a solar panel is positioned to receive sunlight, and an energy receiving component is positioned on an outer surface of a structure such as a window. An energy generating component is positioned on an inner surface of the structure. A generator, a battery and a device are coupled to the energy generating component, so that the device is able to be powered using the solar panel. Once the user sets up the system, the user uses the device as any standard operated device. For example, if the device is a fan, the user switches an on/off switch to turn the device on/off.

In operation, the power generation and transmission device and method enable a device to be used without coupling the device to a standard power grid. Additionally, the system is able to function without cables or wires going through a structure which limits cost and difficulty of installation. Furthermore, a device such as a fan using the power generation and transmission device is able to be low or no noise. The power and transmission device converts energy in various ways such as from renewable energy to kinetic energy.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A renewable energy transmission device comprising:
 a. an renewable energy receiving component;
 b. an actuator capable of using an energy received by the renewable energy receiving component, so that the actuator is capable of causing a first member moving in a rotational manner; and
 c. a second member magnetically coupling with the first member, so that a rotational movement of the first member is able to drive the second member moving in the rotational manner, thereby the energy received is able to be transmitted from the renewable energy receiving component to the second member, wherein the second member comprises a first set of one or more magnets, wherein the first set of one or more magnets are arranged in a way capable of coupling with a second set of one or more magnets of the first member, so that the first member is capable of driving the second member moving in a substantially synchronized manner.

2. The device of claim 1, wherein the renewable energy receiving component comprises a solar panel.

3. The device of claim 1, wherein the renewable energy receiving component comprises a wind turbine.

4. The device of claim 1, wherein the actuator comprises a motor.

5. The device of claim 1, wherein the second member couples with a wind turbine.

6. The device of claim 1, wherein the second member couples with a generator capable of generating electricity.

7. The device of claim 1, wherein the second member couples with a light emitting device.

8. The device of claim 1, wherein the first member is able to remotely drive the movement of the second member with a physical barrier between the first and the second member.

9. A renewable energy transmission device comprising:
   a. a first portion containing a renewable energy receiving member and a first rotor capable of using a renewable energy received by the renewable energy receiving member; and
   b. a base containing a second rotor capable of magnetically coupling with the rotor in the first portion, thereby the renewable energy received is able to be utilized by a utility component coupling with the base, wherein the first portion, the base, or a combination thereof is able to be instantly attached to and detached from two opposite sides of a physical structure.

10. The device of claim 9, wherein the first rotor is capable of remotely coupling with the second rotor, thereby the renewable energy received is able to be transmitted from the first portion to the base with a physical separation between the first portion and the base.

11. The device of claim 9, wherein the physical structure comprises an umbrella, a tent, an awning, a layer of glass, a layer of plastic material, or a combination thereof.

12. The device of claim 9, wherein the first portion comprise a first shell and the base comprise a second shell, wherein the first shell and the second shell are able to form a continuous pattern when the first shell couples with the second shell.

13. A method of renewable energy transferring comprising:
   a. receiving a renewable energy at a first portion;
   b. converting the renewable energy into a first rotational motion; and
   c. generating a second rotational motion at a second portion by using the first rotational motion, thereby the renewable energy is transferred into the second rotational motion, wherein the first portion, the base, or a combination thereof is able to be instantly attached to and detached from two opposite sides of a physical structure.

14. The method of claim 13, wherein the first rotational motion is separated from the second rotational motion with a physical structure.

15. The method of claim 13 further comprising remotely transferring the renewable energy to become the second rotational motion.

* * * * *